US005974374A

United States Patent [19]

Wake

[11] Patent Number: 5,974,374

[45] **Date of Patent: *Oct. 26, 1999**

[54] VOICE CODING/DECODING SYSTEM INCLUDING SHORT AND LONG TERM PREDICTIVE FILTERS FOR OUTPUTTING A PREDETERMINED SIGNAL AS A VOICE SIGNAL IN A SILENCE PERIOD

[75] Inventor: Yasuhiro Wake, Tokyo, Japan

[73] Assignee: NEC Corporation, Tokyo, Japan

[ * ] Notice: This patent is subject to a terminal disclaimer.

[21] Appl. No.: 09/009,163

[22] Filed: Jan. 20, 1998

[30] Foreign Application Priority Data

Jan. 21, 1997 [JP] Japan .................................... 9-008606

[51] Int. Cl.$^{6}$ ................................ G10L 9/14; H04M 3/00

[52] U.S. Cl. ........................... 704/215; 704/210; 704/219

[58] Field of Search .................................... 704/210, 215, 704/219

[56] References Cited

U.S. PATENT DOCUMENTS 4,550,425 10/1985 Anderson et al. ........................ 704/212
4,581,746 4/1986 Arnold ........................................ 380/49
4,696,040 9/1987 Doddington et al. .................... 704/234
5,414,796 5/1995 Jacobs et al. ............................ 704/221
5,475,712 12/1995 Sasaki et al. ............................ 375/241
5,509,102 4/1996 Sasaki ...................................... 704/219
5,539,858 7/1996 Sasaki et al. ............................ 704/212
5,553,190 9/1996 Ohya et al. .............................. 704/201
5,654,964 8/1997 Wake ........................................ 370/395
5,657,421 8/1997 Lorenz et al. ........................... 704/223
5,687,283 11/1997 Wake ........................................ 704/215

FOREIGN PATENT DOCUMENTS 2-44935 2/1990 Japan ................................ H04J 13/00
2-19661 B2 5/1990 Japan ................................ H04L 11/20
2-272850 11/1990 Japan ................................ H04L 12/56
3-64235 3/1991 Japan ................................ H04M 3/00
3-210845 9/1991 Japan ................................ H04J 3/17
4-167635 6/1992 Japan ................................ H04B 14/06
5-22153 1/1993 Japan ................................ H03M 7/30
5-292121 11/1993 Japan ................................ H04L 12/56
7-36497 2/1995 Japan ................................ G10L 9/18

*Primary Examiner*—David R. Hudspeth
*Assistant Examiner*—Tālivaldis Ivars Šmits
*Attorney, Agent, or Firm*—Sughrue, Mion, Zinn, Macpeak & Seas, PLLC

[57] ABSTRACT

In a voice coding section 1, a digital voice signal coded in a voice coder 10, a linear predictive coefficient used as a filter coefficient in a short-term predictive filter 102, a pitch period and a pitch predictive coefficient used, respectively, as a tap coefficient and a filter coefficient in a long-term predictive filter 103, and voice/no-voice status information of an input voice, are multiplexed in a multiplexer 12. Only when the voice/no-voice status information indicate the voice state is a cell assembled and transmitted. In a voice decoding section 2, the received cell is disassembled to provide multiplexed coded data. The voice signal is decoded by a short-term synthesis filter and a long term synthesis filter. The short term synthesis filter uses a linear predictive coefficient as a filter coefficient that is decoded from multiplexed coded data. The long-term synthesis filter uses a pitch period and a pitch predictive coefficient, respectively, as a tap coefficient and a filter coefficient, where the pitch period and pitch predictive coefficient are decoded from the multiplexed coded data. When the cell has been received, the voice signal is output. When the cell has not been received, a noise signal from a noise generator is output. Thus, a voice coding/decoding system can be provided wherein, even upon a change from a silence period to a speech period, the internal state is smoothly transited avoiding the deterioration in voice quality.

3 Claims, 5 Drawing Sheets

VOICE CODING/DECODING SYSTEM INCLUDING SHORT AND LONG TERM PREDICTIVE FILTERS FOR OUTPUTTING A PREDETERMINED SIGNAL AS A VOICE SIGNAL IN A SILENCE PERIOD

FIELD OF THE INVENTION

The present invention relates to a voice coding/decoding system and particularly to a silence suppression, voice coding/decoding system which, through monitoring of a signal input into a coding side, can detect the voice/no-voice status of the input voice and assemblies only coded data on the speech portion into a cell which is then transmitted.

BACKGROUND OF THE INVENTION

In recent years, a code excited linear prediction (CELP) system as a voice analysis/synthesis method and a conjugate-structure algebraic-code-excited linear prediction system (CS-ACELP) are being used in voice coding processing performed in a voice coder.

In a CS-ACELP system, in accordance with ITU-T Recommendation G.729, an excitation pulse is successively passed through a short-term synthesis filter and a long-term synthesis filter, and the position and the polarity of the pulse, which can provide a decoded voice closest to the input signal, are coded and transmitted.

In the silence suppression, a voice coding apparatus is provided where the coding system is combined with a voice detector to transmit only coded data during the speech period. The non-coincidence of the internal state between the voice coding side and the voice decoding side is created in a portion where the no-voice state is changed to the voice state. This poses a problem in that the voice quality is deteriorated at the beginning of the speech period. Voice coding/decoding systems have been proposed in order to solve this problem.

For example, a first conventional voice coding/decoding system interrupts the operation of the coder and the decoder during a silent period during speech, for example. The operation of the coder and the decoder is resumed simultaneously with the initiation of a speech period. This permits the internal state on the voice coding side to be coincident with the internal state on the voice decoding side. As a result, the deterioration of the quality of the voice is reduced. (See, for example, Japanese Patent Laid-Open Nos. 064235/1991 and 272850/1990).

A second conventional coding/decoding system is such that the same object as described above is attained by refuging a delay element of a coding filter and a decoding filter during the silent period in a memory and loading the delay element from the memory at the beginning of the speech. (See, for example, Japanese Patent Laid-Open No. 0210845/1991).

A third conventional coding/decoding system resets or initializes a coder and a decoder each to a specified value in the silent period to provide coincidence in an internal state at the beginning of the speech, thereby preventing deterioration of the voice (see, for example, 292121/1993, 167635/1992, and 244935/1990).

The above described conventional voice coding/decoding systems have the following problems. According to the first described conventional coding/decoding system, the operation of the coder and the decoder is interrupted during the silence period of speech rendering the internal state on the voice coding side and the internal state on the voice decoding side coincident with each other. According to the second conventional coding/decoding system, the internal state at the time of switching from a speech period to a silence period is saved in a memory to render the internal state on the voice coding side and the internal state on the voice decoding side coincident with each other. In the first and second voice coding/decoding systems, input of the voice initiates the voice state initiating the original coding process and the decoding process. In this case the internal state is not smoothly transited, since there is no correlation between, the internal state in the coding and the decoding obtained from the input voice, and the held internal state, resulting in deteriorated voice quality.

In particular, when the first and second voice coding/decoding systems are applied to a coding system, comprising a combination of a short-term predictive filter and a long-term predictive filter (corresponding to a short-term synthesis filter and a long-term synthesis filter on the decoding side), adopted in recent highly efficient voice coding systems, (such as CS-ACELP), no significant deterioration in voice quality due to a relatively short impulse response in the internal state of the short-term predictive filter is apparent.

However, the impulse response of the long-term predictive filter is considerably longer such that a significant amount of time is taken during a period when the speech period is initiated. In this case, the held internal state is used as an initial value. In addition, the impulse response concludes with the internal state of the original coding/decoding processing. This poses a problem of a significant deterioration in voice quality until the impulse response is concluded.

The long-term predictive filter utilizes the periodicity of a stationary portion in a vowel during speech. In this case, a satisfactory effect can be expected in the stationary portion associated with a vowel. On the other hand, the effect of a prediction in the no-voice/silence portion is unknown. As a result the predictive gain approaches 0 (zero).

Therefore, when the conventional first or second method is applied to the long-term predictive filter, having the above characteristics, the initial value of the long-term predictive filter in the speech initiation portion has an unfavorable value corresponding to the stationary portion associated with a vowel, or the like.

According to the third conventional coding/decoding system, during the silence period, the coder and the decoder are reset or initialized to a specified value to achieve coincidence in the internal state at the beginning of speech.

As described above, however, input of the voice initiates the voice state and the original coding and decoding process. In addition, there is no correlation between the internal state in the coding and decoding obtained from the input voice and the internal state of the initial value. Furthermore, the internal state is not smoothly transited resulting in a deteriorated voice quality.

As described above, in the coding system, comprising a combination of a short-term predictive filter and a long-term predictive filter (corresponding to a short-term synthesis filter and a long-term synthesis filter on the decoding side), adopted in a highly efficient voice coding system, such as CS-ACELP, effective coding is executed at the beginning of speech depending upon the predictive gain of the short-term predictive filter.

On the other hand, the long-term predictive filter cannot be operated to develop the predictive filter effective unless the long-term predictive filter is initiated from a predictive gain of 0 (zero) and the input signal is gradually transited to a stationary voice signal.

For this reason, application of the third coding/decoding system to a coding system comprising a short-term predictive filter and a long-term predictive filter is useful in the long-term predictive filter in the speech initiation portion where the effect cannot be originally expected. According to the third coding/decoding system, however, the expected effect of the short-term predictive filter cannot be attained. As a result, voice quality is deteriorated.

Therefore, even though the voice coding/decoding systems are operated effectively in a silence suppression, voice coding/decoding system comprising a coding system relying upon short-term prediction alone, such as ADPCM (adaptive differential PCM) or APC (adaptive predictive coding), and a voice activity detector, combined with a recent coding system comprising a short-term prediction and long-term prediction to enhance the coding efficiency, unfavorably results in deteriorated voice quality in the speech initiation portion.

SUMMARY OF THE INVENTION

Accordingly, it is an object of the invention to provide a voice coding/decoding system wherein the internal state is smoothly transited even in the case of a change from a silence period to speech period, thereby enabling the deterioration in voice quality to be avoided.

According to the invention, a voice coding/decoding system comprising: a voice coding section provided between an ATM transmission line for transmitting and receiving digital data in an asynchronous transfer mode using a cell having a fixed length and a switchboard for performing a single-office exchange of a voice signal, the voice coding section being adapted for coding a voice signal with a high efficiency to produce coded data which are then transmitted as a cell to the ATM transmission line; and a voice decoding section for disassembling the cell received from the ATM transmission line and decoding the coded data to produce a voice signal, the voice coding section comprising:

- a voice coder comprising a short-term predictive filter using a linear predictive coefficient, extracted from a input voice signal, as a filter coefficient and a long-term predictive filter wherein a pitch period, which is a fundamental frequency of the voice extracted from the voice signal, is used as a tap coefficient and a pitch predictive coefficient extracted from the voice signal is used as a filter coefficient, the voice coder being adapted for coding the voice signal using the short-term predictive filter and the long-term predictive filter to produce a digital voice signal which is then output;
- a voice detector for detecting the voice/no-voice status of the voice signal and outputting the voice/no-voice status information as the detection results;
- a voice coder controller for controlling the operation of the short-term predictive filter and the long-term predictive filter in the voice coder based on the voice/no-voice status information;
- a multiplexer for multiplexing and outputting the digital voice signal, the linear predictive coefficient, the pitch period, and the pitch predictive coefficient and the voice/no-voice status information as multiplex coded data; and
- a cell assembler for assembling the multiplex coded data into a cell, only when the voice/no-voice information multiplexed in the multiplexed, coded data indicates the voice state, which is then output to the ATM transmission line, the voice decoding section comprising:

- a cell disassembler for disassembling the cell received from the ATM transmission line and outputting the multiplexed, coded data and, at the same time, outputting reception status information on cell received/cell unreceived as cell reception status;
- a voice decoder comprising a short-term synthesis filter using a linear predictive coefficient, decoded from the multiplexed, coded data from the cell disassembler, as a filter coefficient and a long-term synthesis filter wherein a pitch period decoded from the multiplexed, coded data is used as a tap coefficient and a pitch predictive coefficient decoded from the multiplexed, coded data is used as a filter coefficient, the voice decoder being adapted for decoding the multiplexed, coded data, using the short-term synthesis filter and the long-term synthesis filter into voice signals;
- a voice decoder controller for controlling the operation of the short-term synthesis filter and the long-term synthesis filter in the voice decoder based on the reception status information;
- a noise generator for outputting a predetermined noise signal as a voice signal in the silence period; and
- a selector selectively outputs the voice signal from the voice decoder when the reception status information indicates that the cell has been received and selectively outputs the noise signal from the noise generator when the reception status information indicates that the cell has not been received.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
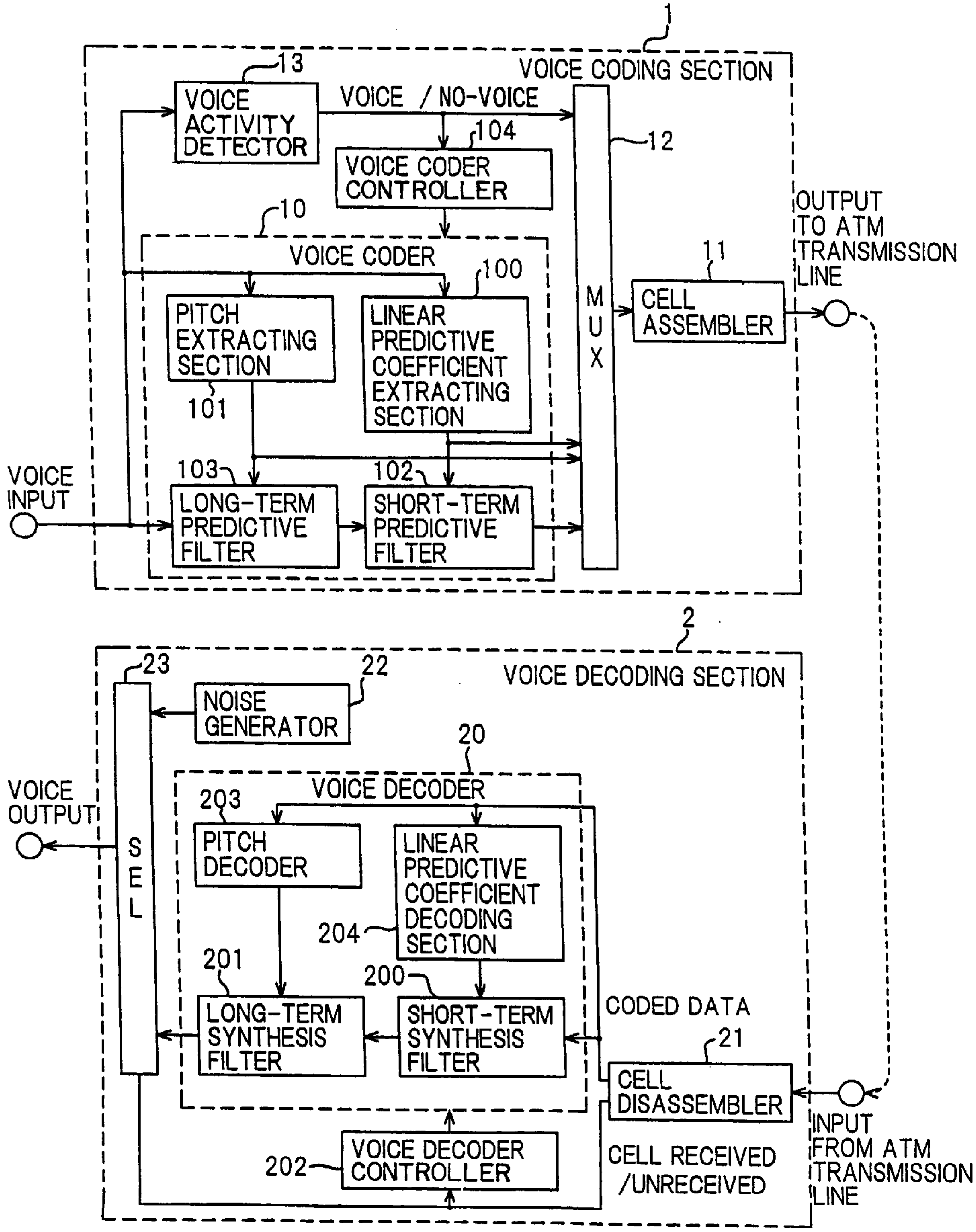
FIG. 1 is a block diagram of a voice coding/decoding system according to a first preferred embodiment of the present invention.

FIG. 1 shows a block diagram of a voice coding/decoding system according to a first preferred embodiment of the present invention. In the drawing, a voice coding section 1 comprises: a voice coder 10 for converting an input voice to various coded data; a voice activity detector 13 for detecting the voice/no-voice status of the input voice (voice signal in telephone band) and outputting the voice/no-voice status information; voice activity detector controller 104 for controlling the voice coder 10 based on the voice/no-voice status information from the voice activity detector 13; a multiplexer (MUX) 12 for multiplexing and outputting the various coded data from the voice coder 10 and the voice/no-voice status information from the voice activity detector 13 as multiplex coded data; and a cell assembler 11 for assembling the multiplex coded data into an ATM cell (hereinafter referred to as a "cell"), having a fixed length in a speech period based on the voice/no-voice status information, which is then output into the ATM transmission line.

The voice coder 10 comprises a linear predictive coefficient extracting section 100 for extracting a linear predictive coefficient from the input voice and sending the extracted linear predictive coefficient as first coded data. A pitch extracting section 101 for extracting a pitch period showing a fundamental frequency of the voice from the input voice and a pitch predictive coefficient and outputting the extracted pitch period and the pitch predictive coefficient as second coded data. A long-term predictive filter 103 for filtering the input voice using the pitch period, from the pitch extracting section 101, as the tap coefficient of the filter and the pitch predictive coefficient, from the pitch extracting section 101, as the filter coefficient and outputting the results; and a short-term predictive filter 102 for filtering the output from the long-term predictive filter 103 using, as the filter coefficient, the linear predictive coefficient as the output from the linear predictive coefficient extracting section 100 and outputting the results as third coded data, that is, as digital voice signal.

On the other hand, a voice decoding section 2 comprises: a cell disassembler 21 which, through monitoring of the data receipt status of the ATM transmission line, disassembles the cell received/unreceived status information and the received cell; a voice decoder 20 for decoding the received, multiplexed, coded data into the original voice signal; a noise generator 22 for outputting a predetermined noise signal showing a silent period; voice decoder controller 202 for controlling the voice decoder 20 based on the receipt cell received/unreceived status information; and a selector 23 for selectively outputting either an output of the noise generator 22 or an output of the voice decoder 20 based on the cell received/unreceived receipt status information.

The voice decoder 20 comprises: a linear predictive coefficient decoding section 204 for decoding the linear predictive coefficient from the multiplexed, coded data as the first coded data output from the cell disassembler 21 and outputting the results of the decoding; a pitch decoding section 203 for decoding the pitch period and the pitch predictive coefficient as the second coded data from the multiplexed, coded data output from the cell disassembler 21 and outputting the decoding results; a short-term synthesis filter 200 for filtering the multiplexed, coded data output from the cell disassembler 21 using the linear predictive coefficient, from the linear predictive coefficient decoding section 204, as the filter coefficient; and a long-term synthesis filter 201 for filtering the output from the short-term synthesis filter 200 based on the pitch period and the pitch predictive coefficient from the pitch decoding section 203 and outputting the filtration results as the voice signal.

The operation of the present invention will be described with reference to FIGS. 1 and 2.

Figure 2:
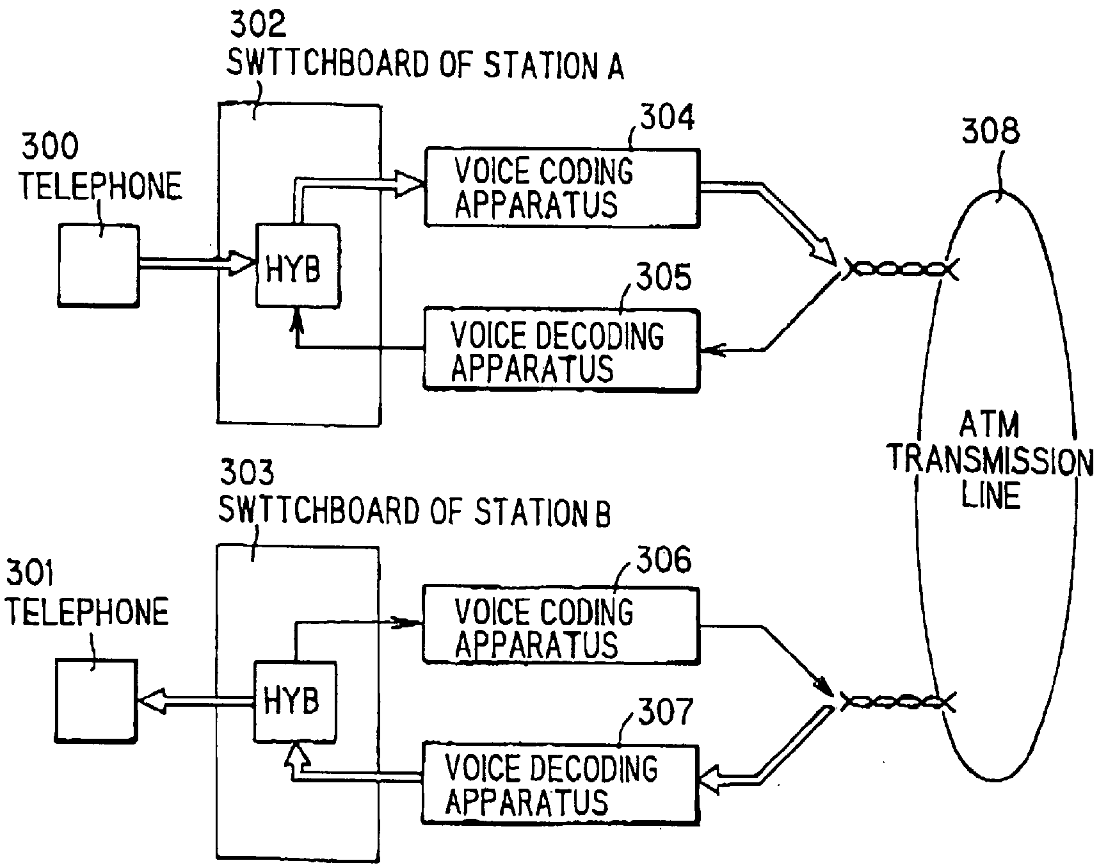
FIG. 2 is a diagram showing a preferred embodiment of the constructing using the voice coding/decoding system of the present invention.

FIG. 2 is a diagram showing a preferred embodiment using the coding/decoding system of the present invention.

In FIG. 2, a voice signal from a telephone 300 is input through a switchboard 302 of station A into a voice coding apparatus 304 having the same construction as the voice coding section 1 shown in FIG. 1.

In the voice signal, the speech portion alone is converted to multiplexed, coded data by the voice activity detector 13 and the voice coder 10 in the voice coding apparatus 304 and assembled into an ATM cell which is then sent as a speech cell to an ATM transmission line 308 wherein digital data are transmitted and received in an asynchronous transmission mode (ATM).

The speech cell passed through the ATM transmission line 308 is input into a voice decoding apparatus 307 having the same construction as the voice decoding section 2 shown in FIG. 1 and decoded into the voice signal by means of the voice decoder 20 from the multiplexed, coded data. The voice signal is then passed through a switchboard 303 of station B and transmitted to a telephone 301.

Only in the speech period when the cell is received does the voice decoding apparatus 307 selectively output the output of the voice de coder 20 which is then input into the switchboard 303. During the cell unreceived period, the voice decoding apparatus selectively outputs the output of the noise generator 222, within the voice decoding apparatus 307, which is then input into the switchboard 303. Thus, a feel of interruption of the voice in a call due to the silence suppression is reduced.

The operation of the internal section of the voice coding apparatus 304 and the voice decoding apparatus 307 will be described with reference to FIG. 1.

As shown in FIG. 1, the voice signal, which has been input into the voice coding apparatus 304 (voice coding section 1), is input into the voice coding section 10 and the voice activity detector 13 simultaneously.

In this case, in the input to the voice coder 10 only, the voice signal travels through a delay buffer in order to absorb the delay time caused by the input of the voice into the voice detector 13 to the output of the results of the detection from the voice activity detector 13.

In the voice activity detector 13, the input signal is always monitored to judge whether the status is in the voice state or the no-voice state. The results are output from the voice activity detector as the voice/no-voice status information and input into the voice decoder control means 104 and the multiplexer 12.

In the voice coder 10, LPC analysis of the input voice is executed in the linear predictive coefficient extracting section 100 to extract a linear predictive coefficient which is then output from the extracting section 100 as first coded data and input to the multiplexer 12. At the same time, the first coded data is input into the short-term predictive filter 102 using the linear predictive coefficient as a filter coefficient.

The transmittance H of the short-term predictive filter 102 can be expressed by the following equation 1.

$$H(z) = 1 + \sum_{i=1}^{P} a_i z^{-i} \qquad \text{(Equation 1)}$$

wherein $z^{-i}$ represents the delay element of the filter, a, represents the linear predictive coefficient, and P represents the degree of the linear prediction. For example, in the CS-ACELP coding system of ITU-T Standard G.729, P is 10.

On the other hand, the pitch analysis of the input voice is executed in the pitch extracting section 101 to determine the pitch period and the pitch predictive coefficient of the input voice.

The output of the pitch extracting section 101 is input as second coded data into the multiplexer 12. At the same time, the second coded data is input into the long-term predictive filter 103 where a long-term predictive filter, using the pitch predictive coefficient as the filter coefficient and the pitch period as the tap coefficient, is constructed.

The transmittance of the long-term predictive filter can be expressed by the following equation 2.

$$H_p(Z)=1+\beta Z^{-T} \qquad \text{(Equation 2)}$$

wherein $z^{-T}$ represents the delay element of the filter, T represents the pitch period, and β represents the pitch predictive coefficient.

The long-term predictive filter for the pitch prediction is called an "adaptive codebook" in CS-ACELP coding system of ITU-T Standard G.729.

The voice coder control means 104 performs control in such a manner that, in a period where the voice/no-voice status information exhibits the no-voice silence state, filter processing in the short-term predictive filter 102 represented by the equation 1 is interrupted and the delay element is held.

Further, in the silence period, the delay element in the long-term predictive filter 103, represented by the equation 2, and the pitch predictive coefficient are controlled so that they are cleared to 0 (zero).

Upon a change from the no-voice state to the voice state, control is performed by the voice coder control means 104 in such a manner that, for the short-term predictive filter 102, the initial value for the short-term predictive filter 102 equals the state of the delay element in the end portion of the previous speech period, while, the predictive gain for the long-term predictive filter is 0 (zero). The delay element is also cleared, followed by initiation of the coding processing in these state.

On the other hand, in the voice decoding apparatus 307 (voice decoding section 2) connected to the ATM transmission line 308, the receipt/unreceipt of the cell is always monitored by the cell disassembler 21, and the receipt status information of cell received/unreceived is output as the results of monitoring. The results are then input to the voice decoder control means 202 and the selector 23.

In this case, when the receipt status information from the cell disassembler 21 indicates that the cell has been received, the selector 23 selectively outputs the output of the voice decoder 20 which is input into the switchboard 303. On the other hand, when the receipt status information from the cell disassembler 21 indicates that the cell has not been received, the selector 23 selectively outputs the output of the noise generator 22.

In the voice decoder 20, the linear predictive coefficient as the first coded data is extracted by the linear predictive coefficient decoding section 204 from the multiplexed, coded data output from the cell disassembler 21.

The extracted linear predictive coefficient is used as the filter coefficient of the short-term synthesis filter 200. Therefore, the transmittance of the short-term synthesis filter 200 is equal to the inverse function of the equation 1.

Further, in the voice decoder 20, the pitch predictive coefficient and the pitch period as the second coded data are extracted by means of the pitch decoder 203 from the coded data output from the cell disassembler 21.

The information on pitch is input into the long-term synthesis filter 201 wherein the same synthesis filter as that on the coding side is constructed. Therefore, the transmittance of the long-term synthesis filter is equal to the inverse function of the equation 2.

The voice decoder control means 202 performs control in such a manner that, in a period where the receipt status information of cell received/unreceived indicates that the cell has not been received, as with the silent period on the coding side, filter processing in the short-term synthesis filter 200 is interrupted and the delay element is held. In this case, at the same time, control is performed so that the delay element and the pitch coefficient in the long-term synthesis filter 201 are cleared to 0 (zero).

Under the control of the voice decoder control means 202, the initial state of each filter at the time of a change from the cell being unreceived to the cell being received coincides with that of the short-term predictive filter 102 and the long-term predictive filter 103 on the coding side.

The second preferred embodiment of the present invention will be described with reference to FIG. 3.

Figure 3:
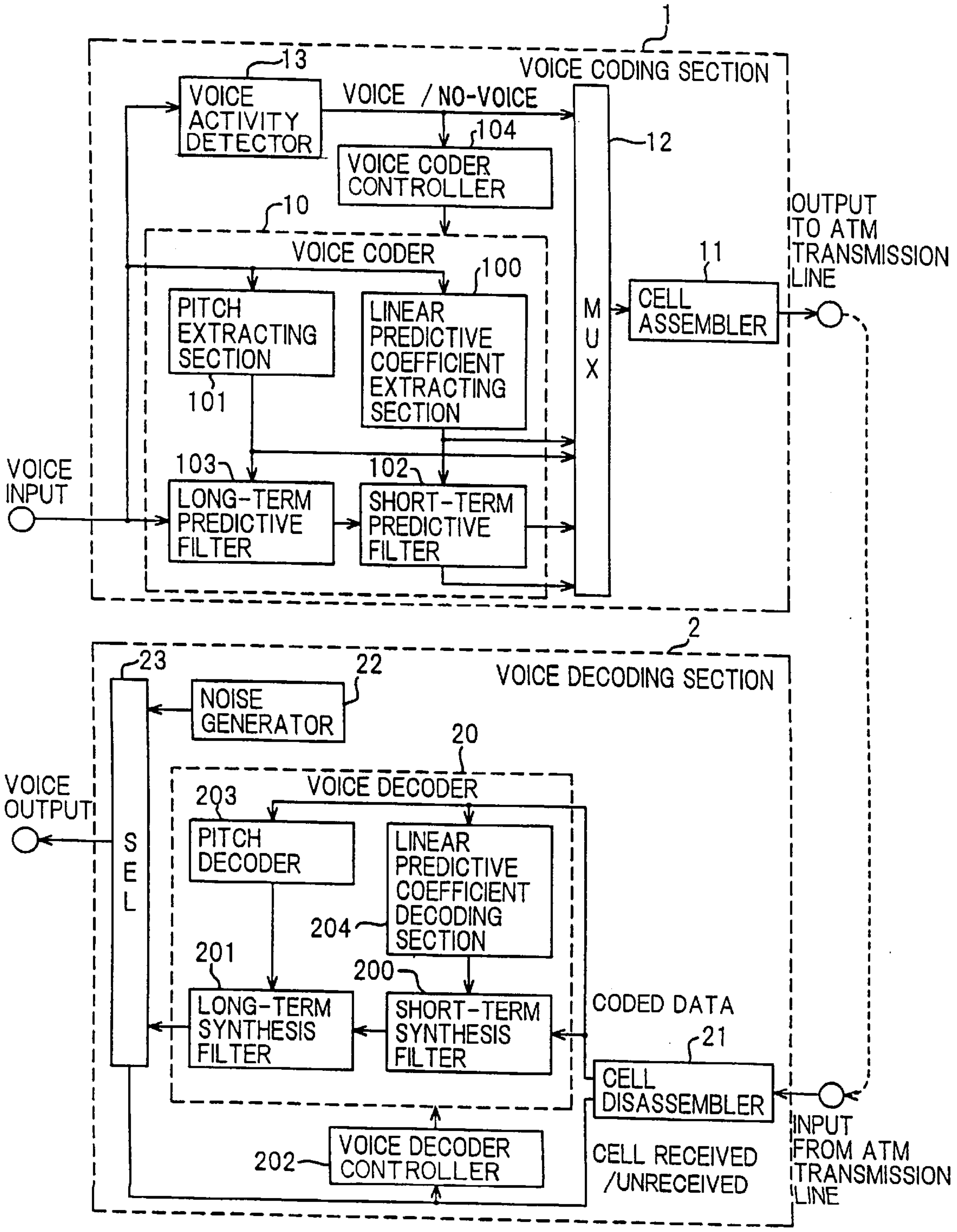
FIG. 3 is a block diagram of a voice coding/decoding system according to a second preferred embodiment of the present invention.
Figure 4:
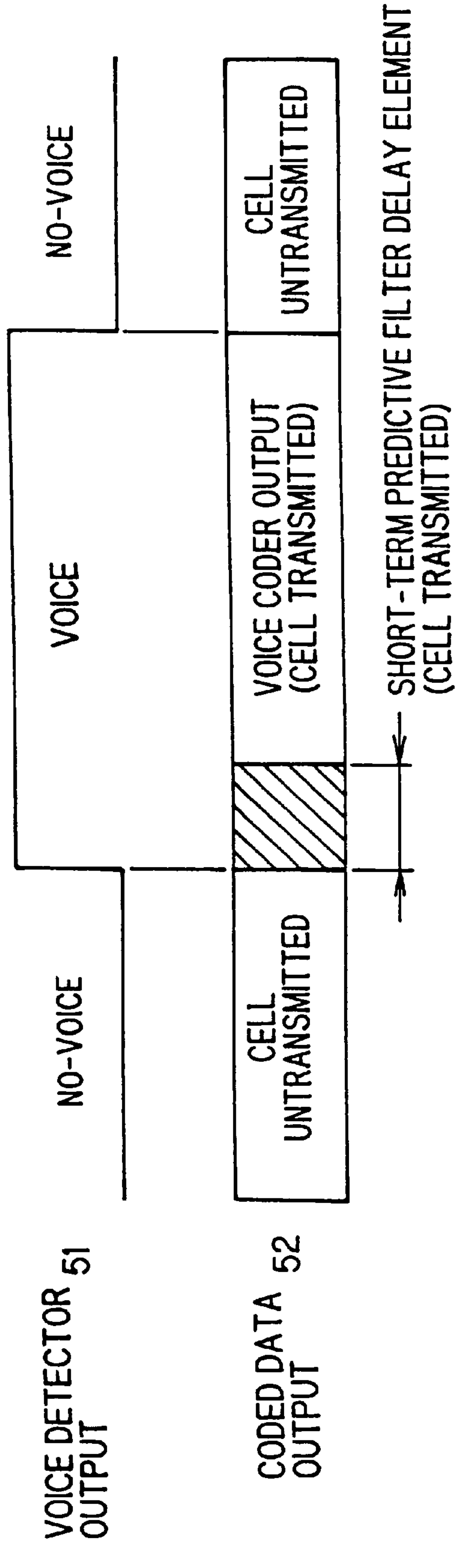
FIG. 4 is an explanatory view showing a delay element sending timing.

FIG. 3 is a block diagram of a voice coding/decoding system according to the second preferred embodiment of the present invention which is a variant of the first preferred embodiment shown in FIG. 1. In the second preferred embodiment of the present invention, the delay element in the short-term predictive filter 102 is sent to the ATM transmission line at the time when the no-voice state is changed to the voiced state. The timing for the sending of the delay element is shown in FIG. 4.

In the second preferred embodiment, since the delay element in the short-term predictive filter 102 is transmitted, the control the interruption and the holding of the delay element described in the first preferred embodiment (see FIG. 1) is not indispensable.

Further, on the decoding side, the initial state of the short-term synthesis filter is stored in the initial data at the time of initiation of the receipt of the cell. Therefore, initialization of the short-term synthesis filter by the received, coded data permits the initial state at the beginning of the voiced state on the coding side to coincide with the initial state at the beginning of the voiced state on the decoding side.

In the second preferred embodiment as with the first preferred embodiment, the voice coder control means 104 on the coding side clears the delay element and the pitch predictive coefficient of the long-term predictive filter 103 in the silence period to 0 (zero), while the voice decoder control means 202 on the decoding side clears the delay element and the pitch coefficient of the long-term synthesis filter 201 to 0 (zero).

The third preferred embodiment of the present invention will be described with reference to FIG. 5.

Figure 5:
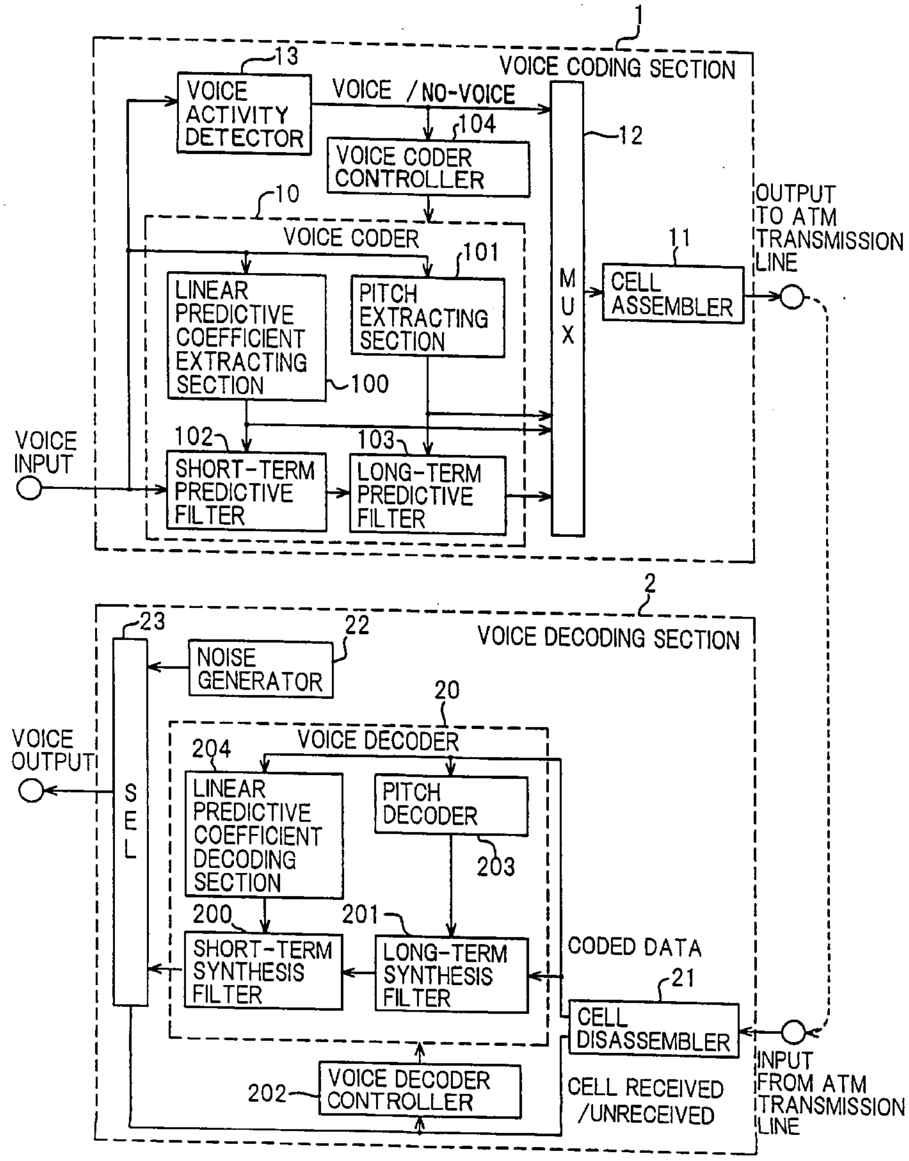
FIG. 5 is a block diagram of a voice coding/decoding system according to a third preferred embodiment of the present invention.

FIG. 5 is a block diagram of a voice coding/decoding system according to the third preferred embodiment of the present invention which is a variant of the first preferred embodiment (FIG. 1). In the third preferred embodiment, the position of the short-term predictive filter and the position of the long-term predictive filter has been reversed.

Therefore, in the voice coding section 1, the input voice is filtered through the short-term predictive filter 102 and then is filtered through the long-term predictive filter 103 to produce third coded data, that is, a digital voice signal.

On the other hand, in the voice decoding section 2, the coded data from the cell disassembler 21 are filtered through the long-term synthesis filter 201 and then are filtered through the short-term synthesis filter 200 to produce as voice signal.

In the coding/decoding system shown in FIG. 5, the other operation is equivalent to that in the first preferred embodiment, and the function and the effect of the third preferred embodiment are the same as those in the first preferred embodiment.

As described above, according to the present invention, in a voice coding section, a digital voice signal coded in a voice coder, a linear predictive coefficient used as a filter coefficient in a short-term predictive filter, a pitch period and a pitch predictive coefficient used respectively as a tap coefficient and a filter coefficient in a long-term predictive filter, and voice/no-voice status information, which exhibits whether the input voice signal is in the voice state or the no-voice state, are multiplexed in a multiplexer, and, only when the voice/no-voice status information exhibits the voiced state, is a cell assembled and transmitted to an ATM transmission line.

In a voice decoding section, the cell received from the ATM transmission line is disassembled to provide multiplexed coded data. The voice signal is decoded by a short-term synthesis filter using a linear predictive coefficient, decoded from the multiplex coded data, as a filter coefficient and is decoded by a long-term synthesis filter using a pitch period and a pitch predictive coefficient, decoded from the multiplex coded data, respectively as a tap coefficient and a filter coefficient. When the cell has been received, the voice signal is output. When the cell has not been received, a noise signal from a noise generator is output.

Therefore, as compared with the prior art, that is, the first conventional voice coding/decoding system (wherein the operation of the coder and the decoder is interrupted in the silent period in the voice to permit the internal state at the beginning of the voice state on the coding side to coincide with the internal state at the beginning of the voice state on the decoding side), the second conventional voice coding/decoding system (wherein the internal state at the time of a change from the voice state to the no-voice state is saved in a memory to achieve coincidence of the internal state), and the third conventional voice coding/decoding system (wherein the coder and the decoder are reset or initialized to a specified value in the silence period to achieve coincidence of the internal state at the beginning of the voice state). According to the present invention an advantage can be obtained wherein, upon a change from the no-voice state to the voice state, the internal state in the voice coder is allowed to coincide with the internal state in the voice decoder, permitting the internal state to be smoothly transited even upon a change from the silent period to the speech period, thereby avoiding the deterioration in voice quality.

Further, when the voice/no-voice status information indicates the voice state, filtering is executed in the short-term predictive filter and the long-term predictive filter. On the other hand, when the voice/no-voice status information indicates the no-voice state, the short-term predictive filter is interrupted to hold the filter delay element. At the same time, the filter delay element and the pitch predictive coefficient of the long-term predictive filter are initialized. Further, when the receipt status information indicates that the cell has been received, filtering is performed in the short-term synthesis filter and the long-term synthesis filter. When the receipt status information indicates that the cell has not been received, the short-term synthesis filter is interrupted to hold the filter delay element and, at the same time, the filter delay element and the pitch predictive coefficient of the long-term synthesis filter are initialized. This arrangement can prevent the deterioration of the voice quality in the speech head portion at the time when the silence period changes to the speech period.

Furthermore, when the voice/no-voice status information indicates the voice state, filtering is performed in the short-term predictive filter and the long-term predictive filter. When the voice/no-voice status information indicates the no-voice state, filtering is performed in the short-term predictive filter and, at the same time, the filter delay element in the long-term predictive filter is initialized. When the no-voice state has changed to the voice state, the filter delay element in the short-term predictive filter is input into the multiplexer. When the receipt status information indicates that the cell has been received, filtering is performed in the short-term synthesis filter and the long-term synthesis filter. When the receipt status information indicates that the cell has not been received, the filter delay element in the short-term synthesis filter is initialized, and when the status of the cell has changed to that of being received, the short synthesis filter is initialized by the filter delay element in the short-term predictive filter by decoding the multiplexed, coded data. This arrangement can prevent the deterioration voice quality in the speech head portion at the time when the silence period changes to the speech period. In addition, the need to perform control on the interruption of the operation of the short-term predictive filter and the short-term synthesis filter in the silent period and the cell unreceipt period and the need to perform the holding of the delay element in the filters can be eliminated, thereby simplifying the control.

The invention has been described in detail with particular reference to preferred embodiments, but it will be understood that variations and modifications can be affected within the scope of the present invention as set forth in the appended claims.

What is claimed is:

1. A voice coding/decoding system comprising: a voice coding section provided between an ATM transmission line for transmitting and receiving digital data in an asynchronous transfer mode using a cell having a fixed length and a switchboard for performing a single-office exchange of a voice signal, the voice coding section being adapted for coding a voice signal with a high efficiency to produce coded data which are then transmitted as a cell to the ATM transmission line; and a voice decoding section for disassembling the cell received from the ATM transmission line and decoding the coded data to produce a voice signal, the voice coding section comprising:

a voice coder comprising a short-term predictive filter using a linear predictive coefficient, extracted from a input voice signal, as a filter coefficient and a long-term predictive filter wherein a pitch period, which is a fundamental frequency of the voice extracted from the voice signal, is used as a tap coefficient and a pitch predictive coefficient extracted from the voice signal is used as a filter coefficient, the voice coder being adapted for coding the voice signal using the short-term predictive filter and the long-term predictive filter to produce a digital voice signal which is then output;

a voice detector for detecting the voice/no-voice status of the voice signal and outputting the voice/no-voice status information as the detecton results;

a voice coder controller for controlling the operation of the short-term predictive filter and the long-term predictive filter in the voice coder based on the voice/no-voice status information;

a multiplexer for multiplexing and outputting the digital voice signal, the linear predictive coefficient, the pitch period, and the pitch predictive coefficient and the voice/no-voice status information as multiplex coded data; and a cell assembler for assembling the multiplex coded data into a cell, only when the voice/no-voice information multiplexed in the multiplexed, coded data indicates the voice state, which is then output to the ATM transmission line, the voice decoding section comprising:

a cell disassembler for disassembing the cell received from the ATM transmission line and outputting the multiplexed, coded data and, at the same time, outputting reception status information on cell received/cell unreceived as cell reception status;

a voice decoder comprising a short-term synthesis filter using a linear predictive coefficient, decoded from the multiplexed, coded data from the cell disassembler, as a filter coefficient and a long-term synthesis filter wherein a pitch period decoded from the multiplexed, coded data is used as a tap coefficient and a pitch predictive coefficient decoded from the multiplexed, coded data is used as a filter coefficient, the voice decoder being adapted for decoding the multiplexed, coded data, using the short-term synthesis filter and the long-term synthesis filter into voice signals;

a voice decoder controller for controlling the operation of the short-term synthesis filter and the long-term synthesis filter in the voice decoder based on the reception status information;

a noise generator for outputting a predetermined noise signal as a voice signal in the silence period; and a selector selectively outputs the voice signal from the voice decoder when the reception status information indicates that the cell has been received and selectively outputs the noise signal from the noise generator when the reception status information indicates that the cell has not been received.

2. The voice coding/decoding system according to claim 1, wherein:

the voice coder controller permits the short-term predictive filter and the long-term predictive filter to execute filtering when the voice/no-voice status information indicates the voice state and interrupts the operation of the short-term filter to hold the filter delay element when the voice/no-voice information indicates the no-voice state and initializes the filter delay element and the pitch predictive coefficient of the long-term predictive filter, and the voice decoder controller permits the short-term synthesis filter and the long-term synthesis filter to execute filtering when the reception status information indicates that the cell has been received and interrupts the short-term synthesis filter to hold the filter delay element when the reception status information indicates that the cell has not been received and initializes the filter delay element and the pitch predictive coefficient of the long-term synthesis filter.

3. The voice coding/decoding system according to claim 1, wherein:

the voice coder permits the short-term predictive filter and the long-term predictive filter to execute filtering when the voice/no-voice status information indicated the voiced state, permits the short-term predictive filter to ezecute filtering and initializes the filter delay element of the long-term predictive filter when the voice/no-voice status information indicates the no-voice state, and permits the filter delay element of the short-term predictive filter to be output to the multiplexer upon change from the no-voice state to the voice state, and the voice decoder permits the short-term synthesis filter and the long-term synthesis filter to execute filtering when the reception status information indicates that the cell has been received, initializes the filter delay element of the short-term synthesis filter when the reception status information indicates that the cell has not been received and, upon a change from the cell unreception to the cell reception, causes the short-term synthesis filter to be initialized by the filter delay element of the short-term predictive filter provided by decoding the multiplex coded data.

* * * * *